Oct. 6, 1925.  1,555,958
A. M. FORD
METAL WHEEL AND METHOD OF MAKING SAME
Filed June 13, 1921
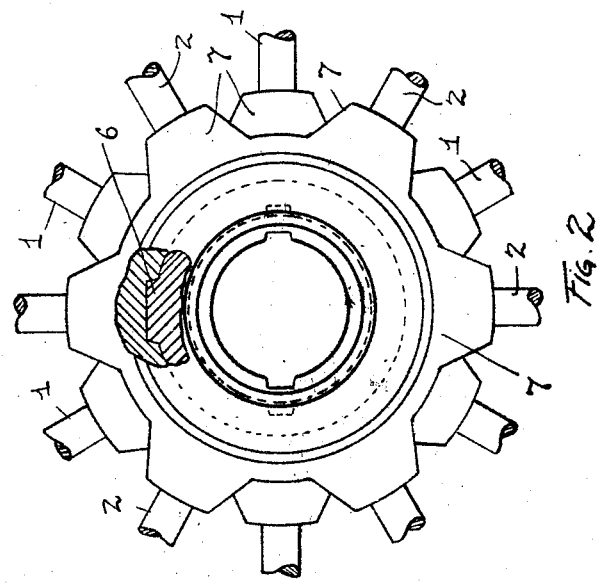
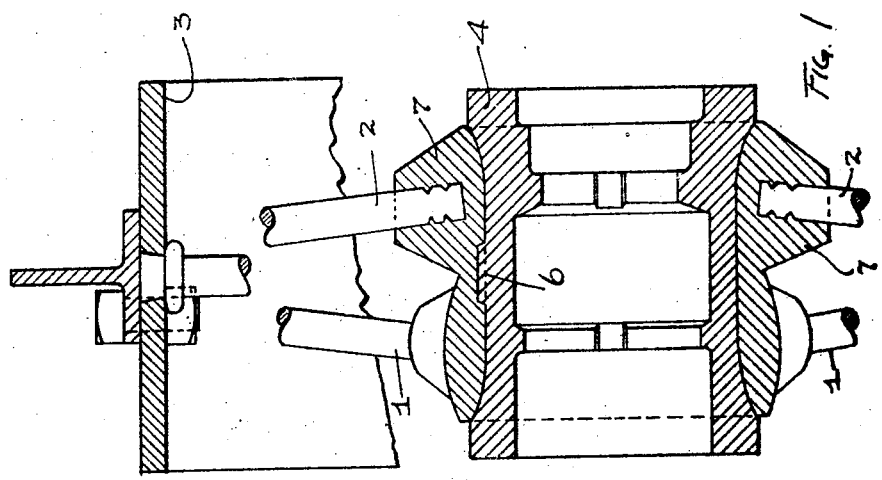
INVENTOR.
Albert M. Ford
BY
ATTORNEYS Patented Oct. 6, 1925.

1,555,958

UNITED STATES PATENT OFFICE.

ALBERT M. FORD, OF GENEVA, OHIO, ASSIGNOR TO THE GENEVA METAL WHEEL COMPANY.

METAL WHEEL AND METHOD OF MAKING SAME.

Application filed June 13, 1921. Serial No. 477,019.

*To all whom it may concern:*

Be it known that I, ALBERT M. FORD, a citizen of the United States, and a resident of Geneva, county of Ashtabula, and State of Ohio, have invented a new and useful Improvement in Metal Wheels and Methods of Making Same, of which the following is a specification, the principle of the invention being herein explained and the best mode in which I have contemplated applying that principle, so as to distinguish it from other inventions.

The present invention relates to a metal wheel of the type commonly used in tractors, farm wagons and the like and to an improved method of making same. One of the principal objects of the invention is to provide a wheel of this general type which shall be simple to construct, convenient to handle during its manufacture and of rigid construction.

It has heretofore been common to secure metal spokes in a suitable mold to cast the hub portion of the wheel directly over the spoke ends. While this is a relatively inexpensive method of making such wheels it occasions great inconvenience during the subsequent operations on the wheel, since the wheels are often quite large, running from three to five and often six feet in diameter and being extremely awkward elements to handle in the factory. It must be remembered that after a wheel is so made the hub portion must be machined and in some cases bearings must be inserted in this hub and the machining of the central portion of an article, say five feet in diameter, is an extremely awkward operation.

I have devised an improved type of wheel which may be made in an extremely simple manner and which requires no machining after its manufacture. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various ways in which the principle of the invention may be used.

In said annexed drawing:—

Fig. 1 is a longitudinal central section through my improved wheel; and Fig. 2 is a side elevation of the same.

In the manufacture of my improved wheel, I first attach in any desired way a series of spokes 1 and 2 to a suitable metal rim 3, which may be of any desired type. Preferably, the outer ends of the spokes are simply inserted through properly spaced apertures in the rim and are then subsequently riveted thereto, as shown in Fig. 1. These spokes are also preferably disposed with their inner ends extending alternately, first to one side and then to the other of the central plane of the wheel, as indicated in the same figure.

The hub, to which the inner ends of the spokes are attached, is a composite structure, the principal element being a member or box 4 in the form of a cylinder, that is machined on its inner surfaces before being assembled in the wheel in the manner indicated in Fig. 1 to receive the axle of a vehicle and the appropriate bearings therefor. In the manufacture of the wheel this pre-formed and machined box 4 is placed in a suitable mold (not shown), and the rim with spokes attached as described above is then disposed concentrically around such box, the inner ends of the spokes being supported so as to lie adjacent to the box and approximately equally distant from the outer surface thereof.

The next step is to cast metal about the ends of the spokes and about the cylindrical box 4, the mold being formed to provide bosses that rise from the main body of cast metal and thus more effectually secure the inner ends of said spokes in place. The exterior surface of the box is preferably concaved so as to present a shallow circumferential groove, and one or more outwardly projecting driving lugs 6 are provided in such groove, so that when the cast body 7 of metal has cooled and set about the box and spoke ends, such groove and lugs will provide a secure driving engagement between the hub, the intermediate member which such cast metal provides, and the spokes.

The intermediate cast member 7, in cooling will of course shrink a certain amount, and this further ensures a close fitting tight engagement between it and the box. Indeed in machining the interior of a box it is desirable to allow for a certain slight contraction in its diameter due to the shrinking of the member 7 in the fashion just described.

A wheel constructed in the manner described is of considerable strength while the above described method of manufacture is relatively inexpensive and obviates the necessity of handling and machining the entire wheel as has been the case in the past.

Other forms may be employed embodying the features of my invention instead of the one here explained, change being made in the form or construction, provided the elements stated by the following claim or the equivalent of such stated elements be employed, whether produced by my preferred method or by others embodying steps equivalent to those stated in the following claim.

I therefore particularly point out and distinctly claim as my invention:—

A metal wheel comprising a rim, spokes secured at their outer ends thereto, a central hub member in the form of a box internally machined to receive a bearing, a seat comprising a circumferential groove formed externally of said box, a radial projection in said groove, an annular body of cast metal seated in said groove and embracing said radial projection, said annular body firmly engaging the inner ends of said spokes.

Signed by me, this 10th day of June, 1921.

ALBERT M. FORD.